US012666504B2

(12) United States Patent
Park et al.

(10) Patent No.: US 12,666,504 B2
(45) Date of Patent: Jun. 23, 2026

(54) ELECTRIC RANGE

(71) Applicant: LG ELECTRONICS INC., Seoul (KR)

(72) Inventors: Myoeng Soo Park, Seoul (KR); Junghyeon Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 880 days.

(21) Appl. No.: 17/830,540

(22) Filed: Jun. 2, 2022

(65) Prior Publication Data

US 2022/0400540 A1 Dec. 15, 2022

(30) Foreign Application Priority Data

Jun. 10, 2021 (KR) ........................ 10-2021-0075511

(51) Int. Cl.
*H05B 6/12* (2006.01)
*H01F 27/26* (2006.01)

(52) U.S. Cl.
CPC ......... *H05B 6/1254* (2013.01); *H01F 27/266* (2013.01)

(58) Field of Classification Search
CPC ............................ H05B 6/1254; H01F 27/266
USPC .......................................................... 219/620
See application file for complete search history.

(56) References Cited

U.S. PATENT DOCUMENTS 7,786,414 B2 * 8/2010 Schilling .............. H05B 6/1263 219/622
2015/0114953 A1 4/2015 Suzuki et al.
2018/0376542 A1 12/2018 Heo et al.

FOREIGN PATENT DOCUMENTS

EP 1 991 030 11/2008
EP 1991030 A2 * 11/2008 ........... H05B 6/1254
EP 2429260 A2 * 3/2012 ........... H05B 6/1254
KR 101450238 B1 * 10/2014 ............. H05B 6/365
KR 10-2016-0150510 12/2016
WO WO 2013 /080404 6/2013

OTHER PUBLICATIONS

Machine Translation of EP1991030A2 (Year: 2025).*
Machine Translation of EP2429260A2 (Year: 2025).*
Machine Translation of KR101450238B1 (Year: 2025).*
European Search Report issued in Application No. 22176335.2 dated Nov. 2, 2022.

* cited by examiner

*Primary Examiner* — Edward F Landrum
*Assistant Examiner* — Thomas J Ward
(74) *Attorney, Agent, or Firm* — KED & ASSOCIATES

(57) ABSTRACT

An electric range is provided that may effectively increase output of a heater by optimizing a shape of each ferrite core without increasing a number of ferrite cores and may secure a maximum area of a through hole that facilitates communication between an inside and outside of a core frame, thereby preventing overheating of the heater and decreasing a use time of the heater.

15 Claims, 12 Drawing Sheets

ELECTRIC RANGE

CROSS-REFERENCE TO RELATED APPLICATION(S)

This application claims priority to and the benefit of Korean Patent Application No. 10-2021-0075511, filed in Korea on Jun. 10, 2021, the disclosure of which is incorporated herein by reference in its entirety.

BACKGROUND

1. Field

An electric range is disclosed herein.

2. Background

Various types of cooking utensils or electric appliances are used to heat food or other items (hereinafter, collectively "food") at home or in a restaurant. Such cooking electric appliances may include gas range using gas and electric ranges using electricity.

An electric range may be largely classified into a resistance heating type and an induction heating type. An electrical resistance type may generate heat by applying a current to a non-metallic heating element such as a metal resistance wire and silicon carbide, and may heat an object, for example, a cooking vessel or container, such as a pot or a frying fan, by radiating or conducting the generated heat. An induction heating type may apply high-frequency power to a coil and generate a magnetic field around the coil, and may heat a heating target made of a metal material by using an eddy current generated in the magnetic field. In other words, when a current is applied to a working coil or a heating coil, a heating target may be induction-heated to generate heat and the heating object may be heated by the generated heat.

A conventional induction heating type electric range having the above configuration includes a heating portion or heater on which a working coil is wound, and a cover plate disposed on an upper surface of the heating portion. The cover plate may have a heating target seated thereon to be induction-heated.

In an electric range including a plurality of heating portions, a plurality of heating portions may generally have a same output or heating capacity, or at least one heating portion has a larger output or heating capacity than the other heating portions. To have the larger output than the other heating portions, the one heating portion may be set to have a larger number of windings of the working coil or to have a larger volume ferrite core than the other heating portions.

In this regard, Korean Patent Application Laid-Open No. 10-2016-0150510 (Patent Document 1), which is hereby incorporated by reference, discloses a configuration in which a pair of ferrite cores having different volumes are alternately disposed in order to increase the output of the heating portion. In Patent Document 1, a total of five pairs of ferrite cores are radially disposed. There is a clear limit to an overall size of the heating portion, and in order to further increase an output of the heating portion and to increase a volume of the ferrite core, the configuration must be changed in such a way that the ferrite core is radially disposed under the core frame of the heating portion.

If the number of the ferrite cores is increased, the ferrite cores must be disposed densely. Accordingly, an area of ventilation holes that provide communication between an inside and outside of the core frame might be reduced or an area of individual ventilation holes might be reduced.

If the area of the ventilation holes is reduced or the area of the individual ventilation holes is reduced, heat inside of the core frame cannot be discharged to the outside and a temperature of the heating portion might rise abnormally. At this time, if the temperature rises abnormally, there will be a problem that power supply to the heating portion might be urgently stopped or the actual operation time might become shorter than the scheduled operation time.

BRIEF DESCRIPTION OF THE DRAWINGS

Embodiments will be described in detail with reference to the following drawings in which like reference numerals refer to like elements, and wherein.

DETAILED DESCRIPTION

Figure 1:
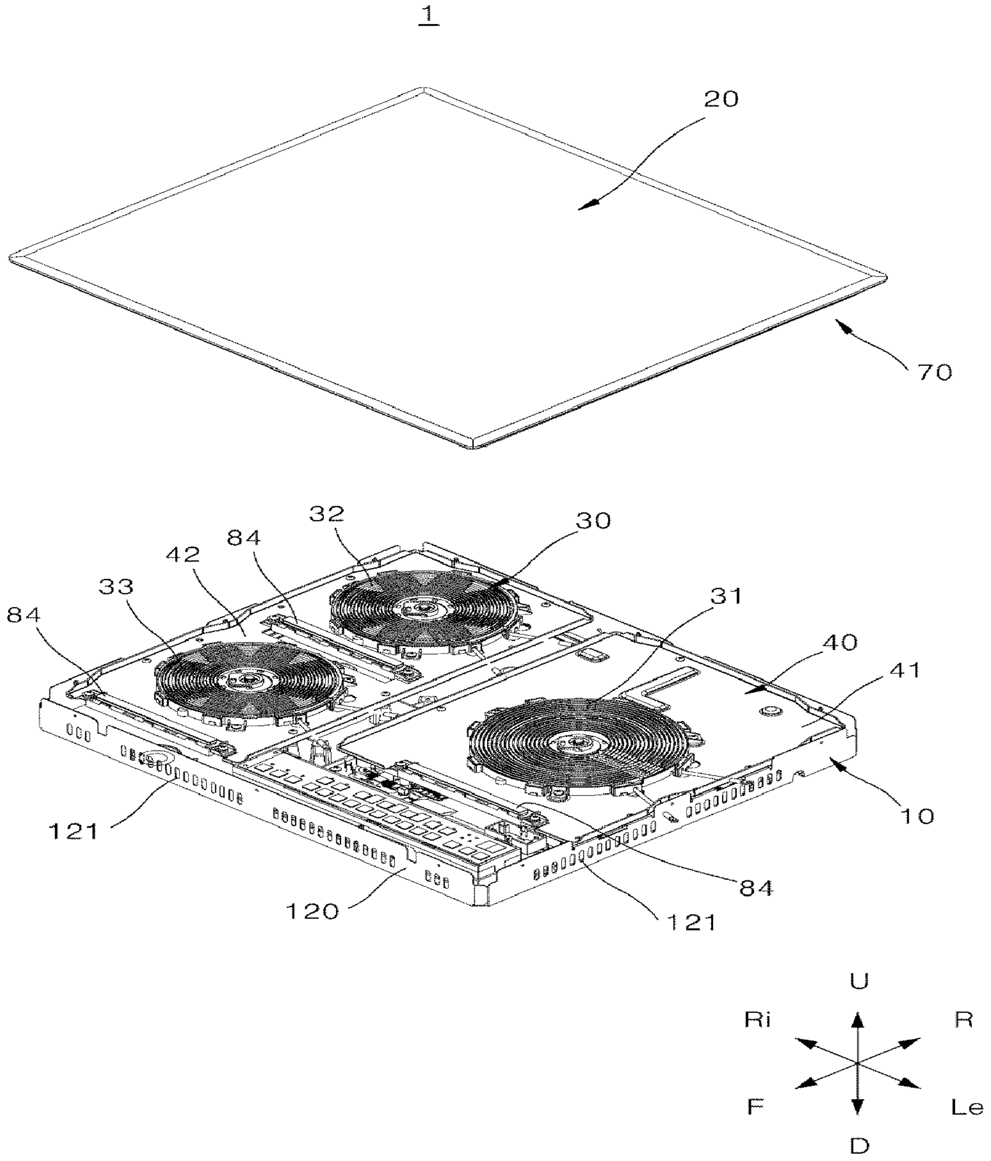
FIG. 1 is an exploded perspective view of an electric range according to an embodiment, in a state in which a cover plate is separated therefrom.

Aspects, features, and advantages are described hereinafter with reference to the accompanying drawings such that one having ordinary skill in the art to which embodiments pertain can easily implement the technical spirit. Descriptions of known technologies in relation to embodiments are omitted if they are deemed to make the gist unnecessarily vague. Hereinafter, embodiments are described with reference to the accompanying drawings. In the drawings, identical reference numerals can denote identical or similar components.

The terms "first" and "second", for example, are used herein only to distinguish one component from another component. Thus, the components should not be limited by the terms. Certainly, a first component can be a second component unless stated to the contrary.

Throughout, each element may be singular or plural, unless stated to the contrary.

Hereinafter, expressions of 'a component is provided or disposed in an upper or lower portion' may mean that the component is provided or disposed in contact with an upper surface or a lower surface. The present disclosure is not intended to limit that other elements are provided between the components and on the component or beneath the component.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Terms such as "include" or "has" are used herein and should be understood that they are intended to indicate an existence of several components, functions or steps, disclosed in the specification, and it is also understood that greater or fewer components, functions, or steps may likewise be utilized.

Throughout, the terms "A and/or B" as used herein can denote A, B or A and B, and the terms "C to D" can denote C or greater and D or less, unless stated to the contrary.

Hereinafter, embodiments will be described, referring to the accompanying drawings showing a configuration of an electric range 1 according to an embodiment.

Figure 2:
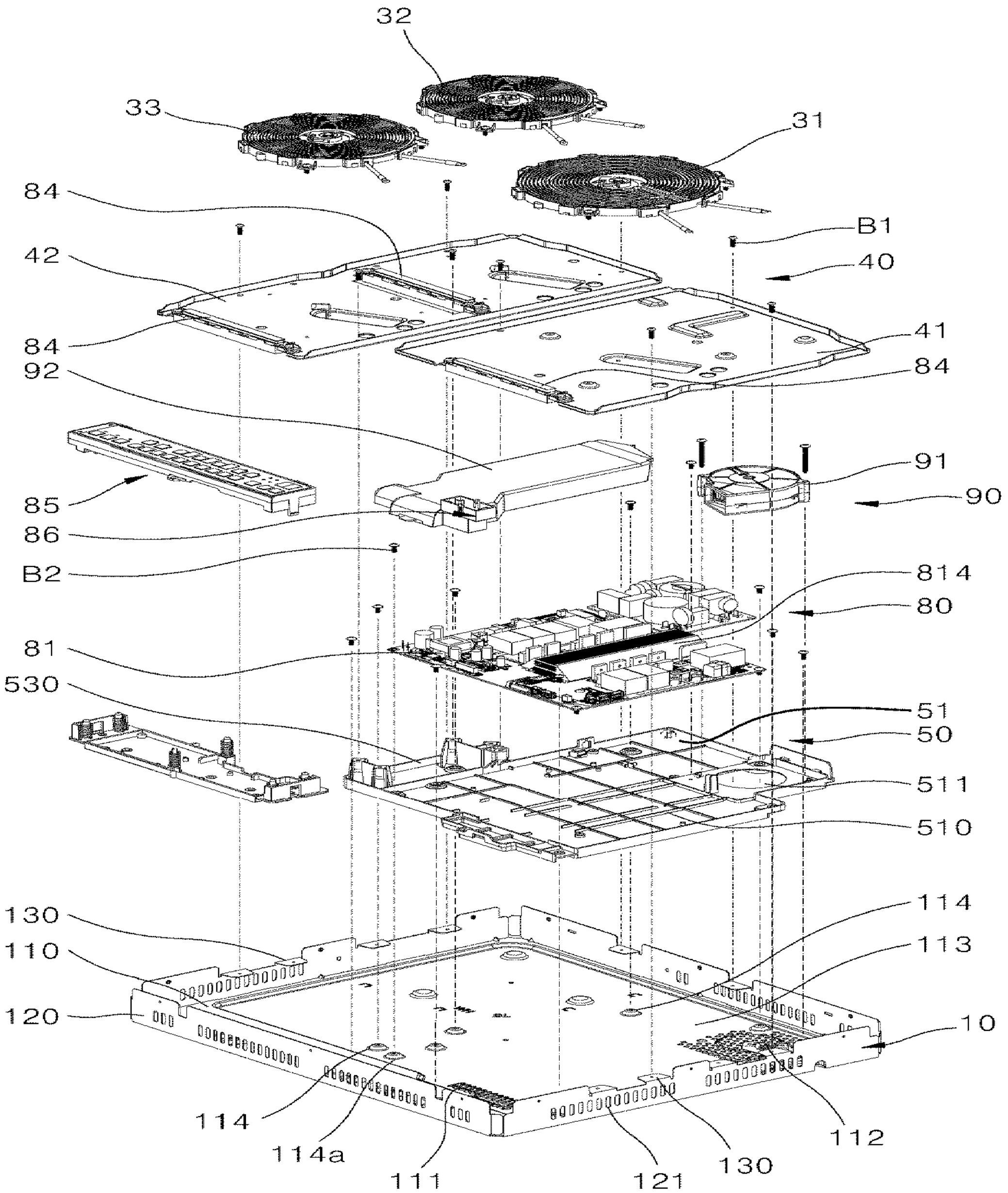
FIG. 2 is an exploded perspective view showing components of the electric range shown in FIG. 1, except the cover plate.

FIG. 1 is an exploded perspective view of an electric range according to an embodiment, in a state in which a cover plate is separated therefrom. FIG. 2 is an exploded perspective view showing components of the electric range shown in FIG. 1, except the cover plate. Referring to FIGS. 1 and 2, the electric range 1 according to an embodiment will be described hereinafter.

The electric range 1 according to this embodiment may be configured to heat a heating target based on an induction heating method. The heating target may be, for example, a tableware containing a metal material, for example, stainless steel or iron.

In the induction heating method, high-frequency power may be applied to a working coil 312, 322, and 332 to generate a magnetic field around the working coil 312, 322, and 332, and an eddy current generated by the magnetic field may be used in heating a heating target made of a metal material. More specifically, high-frequency power may be applied to a heating portion or heater 30 having a structure in which the working coil 312, 322, and 332 is disposed adjacent to a ferrite core, so that a magnetic field may be generated around the working coil 312, 322, and 332. When a heating target is placed in an area in the generated magnetic field, an eddy current may be induced in the heating object by the magnetic field and Joule's heat may be generated by the eddy current to heat the heating target. As the heating target is heated, food contained in the heating target may be heated.

The electric range may include a cover plate 20, the heating portion 30, an upper bracket 40, and a base bracket 50. The case 10 may be configured to define an exterior of the electric range 1 and protect components of the electric range 1. For example, the case 10 may be made of a lightweight metal material, such as aluminum; however, embodiments not limited thereto. The case 10 may be insulated to suppress heat generated by the working coil 312, 313, and 332 from being radiated to outside.

The case 10 may accommodate components of the electric range 1, such as the heating portion 30, the upper bracket 40, and a control circuit board module 80. A top of the case 10 may be open and the open top may be closed by the cover plate 20.

The case 10 may be formed in a box shape by processing a plate-shaped material, for example. The case 10 may include a first casing 110, and a second casing 120.

The first casing 110 may define a bottom surface of the case 10. The first casing 110 may accommodate and support internal components disposed in the above-described electric range in a downward direction.

A plurality of extending portions formed by, for example, press working may be provided as means for facilitating the accommodation and supporting of the internal components.

A downward extending portion 113 among the plurality of extending portions may be formed by, for example, press work to protrude from the first casing 110 in a downward direction (D-direction) as a whole. The first casing 110 may protrude in the downward direction so that a space in a vertical direction (U-direction) may be further secured for the internal components. In addition, a rigidity of the first casing 110 may be further increased.

An upward extending portion 114 may protrude upward from the downward extending portion 113 (U-direction), and may be formed as a circular bead as shown in the drawing, for example. The upward extending portion 114 may be formed at a plurality of positions, and may support a lower surface of a base bracket 50, which will be described hereinafter, to fix the base bracket 50.

To secure the base bracket 50 using a substrate fastening bolt B2, a bolt hole 114*a* through which the substrate fastening bolt B2 may pass, may be formed in the upward extending portion 114. The substrate fastening bolt B2 will be described hereinafter.

That is, the substrate fastening bolt configured to secure the base bracket 50 may have a securing direction from the top to the bottom (D-direction). In this instance, as the upward extending portion 114 protrudes from the downward extending portion 113, there may be a margin for preventing the substrate fastening bolt B2 from extending downward over the first case 110.

The first casing 110 may include an air inlet hole 112 through which air is drawn and an air outlet hole 111 through which air is discharged, to facilitate cooling of the control circuit board module 80 provided therein and circuit elements mounted on the control circuit board module 80. As shown in FIG. 2, the air outlet hole 111 and the air inlet hole 112 may be provided in the form of a grill, thereby preventing inflow of foreign substances.

The second casing 120 may be bent from the first casing 110 and configured to define a lateral surface of the case 110. The second casing 120 may be bent from an edge of the first casing 110 in the vertical direction (U-D direction) to form a side wall of the electric range 1, so that the second casing 120 may surround the base bracket 50, which will be described hereinafter.

The second casing 120 may be formed on each side of the first casing 110 formed in a substantially quadrangular shape. The second casing 120 may reinforce rigidity of the entire case 10. More specifically, the second casing 120 bent from the first casing 110 may be configured to prevent the plate-shaped first casing 110 from being bent or damaged by a weight of the internal components or an external force.

The second casing 120 may further include a ventilation hole 121 formed in a slit shape, and a plurality of the ventilation hole 121 may be provided. The plurality of ventilation holes 121 may facilitate communication between the inside and the outside of the case 100 so that air may flow through the plurality of ventilation holes 121, thereby contributing to cooling of the internal components provided in the case 10.

A supporting flange 130 may be provided in an upper end of the second casing 120. The supporting flange 130 may be bent from an upper end of the second casing 120 toward the inside of the case 10, and may serve to support the upper bracket 140, which will be described hereinafter, from a lower surface. For example, a plurality of the supporting flange 130 may be formed by bending upper ends of a left or first lateral surface, a right or second lateral surface, and a rear surface of the second casing 110. A securing hole 131 for bolting fastening may be provided in each of the supporting flanges 130.

A bottom surface of the upper bracket 40 may be disposed on an upper surface of the supporting flange 130. The upper bracket 40 and the supporting flange 130 may be coupled to each other by a securing means, such as a bracket securing bolt B1. A left or first lateral side end and a rear end of the first upper bracket 41 and a right lateral side end and a rear end of the second upper bracket 42 may be supported and coupled to each other by the supporting flange 130. The right side end of the first upper bracket 41 and the left side end of the second upper bracket 42 may be supported by a supporting bracket 530, which will be described hereinafter.

The cover plate 20 may be coupled to an upper end of the case 10 and a heating target may be placed on the upper surface of the cover plate 20. The cover plate 20 may be configured to close the open top of the case 10 to protect the internal components of the case 10.

The heating target may be put on the upper surface of the cover plate 20 and a magnetic field generated from the heating portion 30 may pass through the cover plate to reach the heating target. For example, the cover plate 20 may be made of a material having excellent heat resistance, such as ceramic or tempered glass; however, embodiments are not limited thereto.

An input interface (not shown) configured to receive an operation input from the user may be provided on the upper surface of the cover plate 20. The input interface may be disposed on a predetermined area of the upper surface of the cover plate 20 and display a specific image.

The input interface may receive a touch input from the user and the electric range 1 may be operated based on the received touch input. For example, the input interface may be a module configured to input a desired heating intensity or heating time by a user, and may be implemented as a physical button or a touch panel, for example.

A touch circuit board module 85 configured to receive a user's touch manipulation input may be provided under the input interface, that is, under the cover plate 20. The touch circuit board module 85 may include a plurality of key switches 851 and a touch circuit board 851 on which and the plurality of key switches 851 are mounted. The user may input a command to the touch circuit board module 85 via the plurality of key switches 851 to control operation of the electric range 1.

In the electric range 1 according to an embodiment, an upper surface of the touch circuit board module 85 may be in close contact with a lower surface of the cover plate 20. The touch circuit board module 85 may be disposed at a position corresponding to the input interface.

The touch circuit board module 85 and the input interface may be connected to each other by a capacitive touch input method. Accordingly, when the user inputs a control command to the input interface, the control command may be input to the touch circuit board module 85.

In addition, a display may be provided on a predetermined area of the upper surface of the cover plate 20 and configured to display an operation state of the electric range 1.

A light display region may be formed on the upper surface of the cover plate 20. A light emitting diode (LED) substrate module 84 may be disposed under the cover plate 20, corresponding to the light display region. Light irradiated from the LED substrate module 84 may be transmitted to the user via the light display region. For example, the LED substrate module 84 may be fixedly disposed on the upper bracket 40, which will be described hereinafter. The upper bracket 40 may include a plurality of substrate supporting portions or supports 417 and 427 to support the LED substrate module 84.

The light display region and the LED substrate module 85 may be disposed in positions corresponding to each other. When a plurality of LED substrate modules 84 is provided, a same number of light display regions may be disposed on the upper surface of the cover plate 20.

The electric range 1 according to one embodiment may further include a cover bracket 70 configured to support the cover plate 20 and connect the cover plate 20 to the case 10. As shown in FIG. 1, the cover bracket 70 may be disposed on an outside of the upper bracket 40 and the case 10, and may be coupled to the case 10, to support the cover plate 20. For example, the cover bracket 70 may be coupled to the case 10 by a securing means such as the case securing bolt (not shown).

A plurality of cover brackets 70 may be provided and each of the cover brackets 70 may be disposed on or at a position corresponding to each side of the cover plate 20 formed in a quadrangle. For example, a total of four cover brackets 70 may be disposed on respective sides of the rectangular cover plate 20.

A plurality of heating portion 30 may be provided and disposed under the cover plate 20, to heat a heating target. A total of three heating portions 30 are shown in the accompanying drawings.

The plurality of heating portions 30 may all explain the induction heating method, or some of the heating portions 30 may explain the induction heating method and other may be a highlight heating device using an electric resistance heating method, so that the electric range 1 may be configured as a so-called hybrid range.

Hereinafter, the electric range 1 including the plurality of heating portions 30 all provided in the induction heating method will be described. The plurality of heating portions 30 may be configured to have a same heating capacity or different heating capacities from each other.

The accompanying drawings show an example of the plurality of heating portions including a first heating portion or heater 31, a second heating portion or heater 32, and a third heating portion or heater 33; however, embodiments are not limited thereto. The first heating portion 31, the second heating portion 32, and the third heating portion 33 all having different heating generation capacities will be described as a standard.

The first heating portion 31 may be secured to the first upper bracket 41. The second heating portion 32 and the third heating portion 33 may be secured to the second upper bracket 42.

The heating portions 31, 32, and 33 may include core frames 311, 322, and 332, respectively. The working coils 312, 322, and 332 may be spirally wound around upper surfaces of the core frames 311, 321, and 331, respectively, and ferrite cores 313, 323, and 333 may be mounted on lower surface of the core frames 311, 321, and 331, respectively. Accordingly, when high-frequency power is applied to the working coils 312, 322, and 332, a magnetic field may be formed around the ferrite core 313, 323, and 333, and an eddy current may be formed in a heating target by the formed magnetic field. Each of the working coils 312, 322, and 332 may include a pair of outgoing wires 312*a*, 322*a*, and 332*a*, and an outgoing tip terminal may be provided at ends of each lead wire 312*a*, 322*a*, and 332*a*.

A temperature sensing portion or sensor 60 may be provided in a center of each heating portion 31, 32, and 33. More specifically, a first temperature sensing portion or sensor 61 may be provided in the first heating portion 31, and a second temperature sensing portion or sensor 62 may be provided in the second heating portion 32. A third temperature sensing portion or sensor 63 may be provided in the third heating portion 33.

The first temperature sensing portion 61 may include a first plate temperature sensor 611 configured to sense a temperature of the cover plate 20 directly above the first heating portion 31, a first thermal fuse 6142 (see FIG. 8) configured to detect whether the temperature of the cover plate 20 increases above a preset or predetermined threshold temperature, a first coil temperature sensor 612 configured to sense a temperature of the first working coil 312, and a first sensor holder 614 in which the first plate temperature sensor 611, and the first thermal fuse 6142 are mounted.

Similarly, the second temperature sensing portion 62 and the third temperature sensing portion 63 may have substantially the same configuration as the first temperature sensing portion 61, respectively. The second temperature sensing portion 62 may include a second plate temperature sensor, a second coil temperature sensor, a second thermal fuse, and a second sensor holder. The third temperature sensing portion 63 may include a third plate temperature sensor, a third coil temperature sensor, a third thermal fuse, and a third sensor holder.

The first to third plate sensors may be configured to directly contact a lower surface of the cover plate 20 so as to measure the temperature of the cover plate 20. Sensing surfaces may be disposed to maintain a contact state with the lower surface of the cover plate 20 at all times.

The first to third coil temperature sensors may be disposed on lower surfaces of the working coils 312, 322, and 332, and may directly contact the working coils 312, 322, and 332 so as to measure the temperature of the working coils 312, 322, and 332. Sensing surfaces may be disposed to maintain a contact state with the working coils 312, 322, and 332 at all times.

The first to third fuses may serve as a kind of thermostat configured to disconnect an internal circuit when the temperature of the cover plate 20 increases above a preset or predetermined threshold temperature. When internal circuits of the first to third thermal fuses are cut off, power supplied to the working coils 312, 322, and 332 may be immediately cut off to discontinue operation of the heating portions 31, 32, and 33 in which overheating occurs.

Those heating portions 31, 32, and 33 may be disposed on and supported by the upper bracket 40. As in the example shown in the drawing, a plurality of the upper bracket 40 may be provided. The upper bracket 40 may include a first upper bracket 41 that supports the first heating portion 31 and a second upper bracket 42 that supports the second heating portion 32 and the third heating portion 33. The upper bracket 40 may be made of a lightweight metal material, for example, aluminum; however, embodiments are not limited thereto.

The first upper bracket 41 may include a first upper plate 411 and a second upper plate 412. The first upper plate 411 may define a bottom surface of the first upper bracket 41, and the first heating portion 31 may be mounted on the first upper plate 411.

The second upper bracket 42 may include a first upper plate 421 and a second upper plate 422. The first upper plate 421 may define a bottom surface of the second upper bracket 42, and the second heating portion 32 and the third heating portion 33 may be mounted on the first upper plate 421.

The first upper plate 411 of the first upper bracket 41 and the first upper plate 421 of the second upper bracket 42 may completely cover a main circuit board module 81 and a power circuit board module 83 provided under the first upper plate in the vertical direction (U-D direction). Due to this structure, the first upper plate 411 of the first upper bracket 411 and the first upper plate 421 of the second upper bracket 42 may serve to shield the electromagnetic field and electromagnetic waves generated from the heating portion 30 from reaching elements mounted on the main circuit board module 81 and the power circuit board module 83. More specifically, the first upper bracket 41 and the second upper bracket 42 may be configured to improve electromagnetic compatibility (EMC) and electromagnetic interference (EMI) performance of the printed circuit board.

The second upper plate 412 of the first upper bracket 41 and the second upper plate 422 of the second upper bracket 422 may be bent from respective first upper plates 411 and 421 in the vertical direction (U-D direction) of the electric range 1. As shown in the drawing, the second upper plates 412 and 422 may be formed at sides of the first upper plates 411 and 421 formed in a substantially quadrangular shape.

A rigidity of the first upper bracket 41 and the second upper bracket 42 may be reinforced as a whole by the second upper plates 412 and 422. That is, the second upper plates 412 and 422 may suppress the plate-shaped first upper plates 411 and 421 from being bent or damaged by the weight of the internal components including the heating portion 30 or an external force.

Each of the first upper plates 411 and 421 may include the pair of outgoing wires 312*a*, 322*a*, and 332*a* discussed above, and a plurality of insertion holes configured to be penetrated by lead wires (not shown) of the temperature sensing portion 60 may be provided. For example, the plurality of insertion holes may include a first insertion hole 414 and 424 through which one of the pair of the outgoing wires 312*a*, 322*a*, and 332*a* may pass, and a second insertion hole 415 and 425 through which the other one of the outgoing wires may pass, and a third insertion hole 416 and 426 through which the lead wire of the temperature sensing portion 60 may pass. The pair of lead wires 312*a*, 322*a*, and 332*a* and the lead wire of the temperature sensing portion 60 may pass through the plurality of insertion holes and extend in the downward direction (D-direction), thereby electrically connected to the control circuit board module 80.

In addition, the first upper plate 411 and 421 may include a plurality of extending portions that protrudes in the upward direction (U-direction) or the downward direction (D-direction). The extending portion that protrudes in the downward direction (D-direction) may be referred to as an anti-pressing extending portion 411*a* and 421*a*. The anti-pressing portion may serve to prevent the lead wires 312*a*, 322*a* that extend outward in a radial direction (r-direction) from a center of each heating portion 31, 32, and 33 among the pair of lead wires 312_a_, 322_a_, and 332_a_ from being pressed in a mounting process of the heating portions 31, 32, and 33. More specifically, the anti-pressing portion 411_a_ and 421_a_ may serve as a passage for the outgoing wire 312_a_, 322_a_, and 332_a_ that extend outward from the center of the heating portion 31, 32, and 33.

The extending portion that protrudes in the upward direction (U-direction) may be referred to as a securing portion 413. The securing portion 413 may support the heating portion 31, 32, and 33, and may prevent a securing means, such as bolts, from extending in the downward direction (D-direction) after passing through the first upper plate 411 and 421. In other words, the securing portion 413 may provide a margin for preventing the securing means, for example, bolts, from interfering with the control board circuit module 80 disposed in the downward direction (D-direction).

The LED substrate module 84 may be disposed on each of the first upper bracket 41 and the second upper bracket 42. The substrate support portions 417 and 427 that support the LED substrate module 84 may be formed in the first upper plate 411 of the first upper bracket 41 and the first upper plate 421 of the second upper bracket 421, respectively. The substrate supporting portions 417 and 427 may be formed by partially cutting-away the first upper plate 411 of the first upper bracket 41 and the first upper plate 421 of the second upper bracket 42.

In the example shown in the drawing, one substrate supporting portion 417 may be provided in the first upper bracket 41 on which the first heating portion 31 is disposed. Two substrate supporting portions 427 may be formed in the first upper bracket 41 on which the second heating portion 32 and the third heating portion 33 are disposed.

A plurality of LEDs may be aligned on the LED substrate module 84. The plurality of LEDs may be luminescent when the heating portion 30 is turned on so that the user may be visually informed of whether the heating portion 30 is in operation or an operation state. The LED substrate module 84 may change a luminescent shape, or color, for example, of the plurality of LEDs to inform the user whether or not the electric range 1 is operating and the operation state.

The base bracket 50 may be disposed under the first upper bracket 41. The main circuit board module 81 and the power circuit board module 83 forming the control circuit board module 80 may be mounted on the base bracket 50. The base bracket 50 may be configured to support the main circuit board module 81, the power circuit board module 83, and a ventilation module 90.

Figure 3:
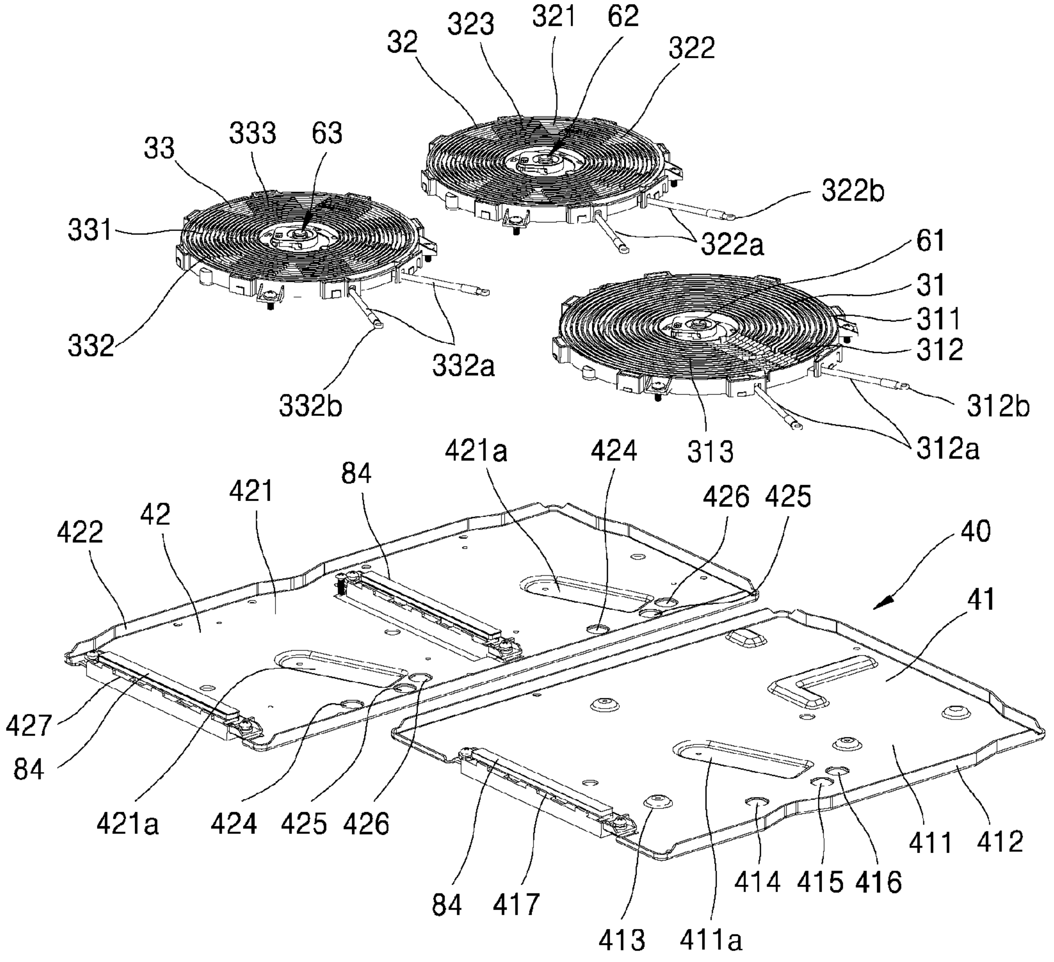
FIG. 3 is an exploded perspective view of a heating portion and an upper bracket shown in FIG. 2.
Figure 4:
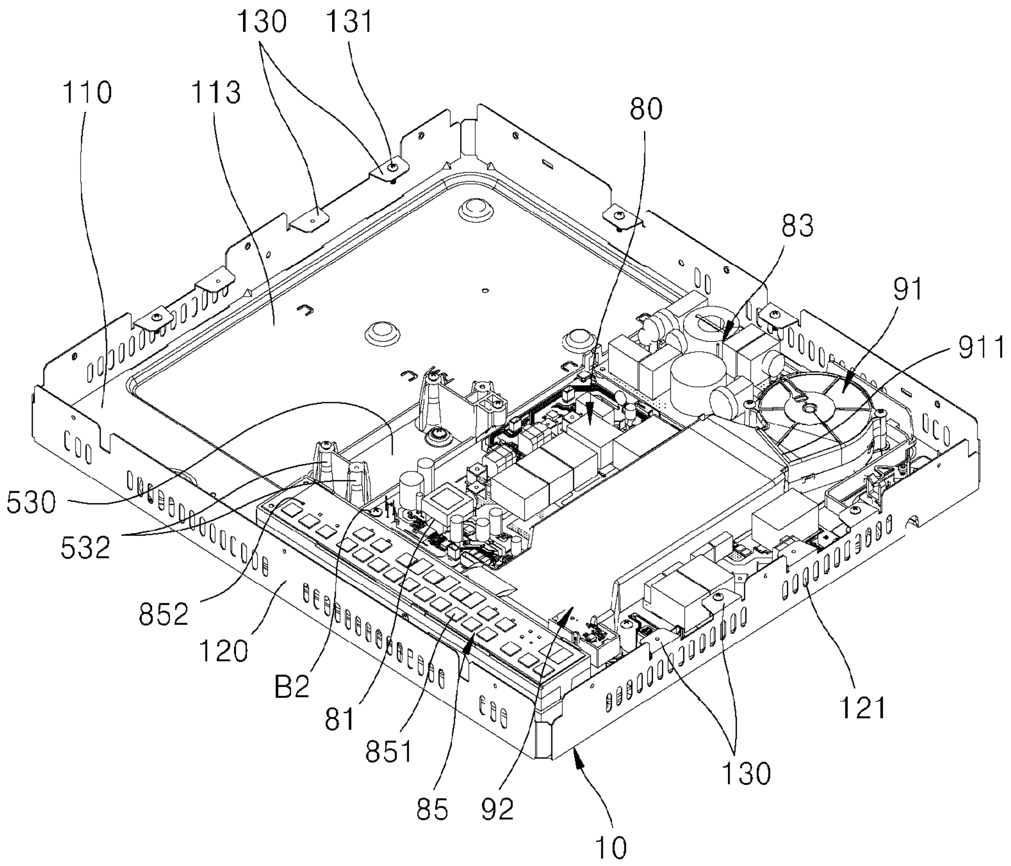
FIG. 4 is a perspective view showing an assembled state of a base bracket, a control circuit board module, and a ventilation module disposed in a case shown in FIG. 2.

The upward extending portions 114 formed in the first casing 110 may support the lower surface of the base bracket 50 at a plurality of positions. As shown in FIGS. 3 and 4, the base bracket 50 may include a substrate bracket 51 including a bottom plate 510 and a lateral plate 520.

The bottom plate 510 may define a bottom surface of the base bracket 50. The main circuit board module 81, the power circuit board module 83, and the ventilation module 90 may be mounted on an upper surface of the bottom plate 510.

Substrates or printed circuit boards 811 and 831 provided in the main circuit board module 81 and the power circuit board module 83 may be secured to the bottom plate 510 via a plurality of substrate fastening bolts B2. The substrate fastening bolt B2 may extend to the upward extending portion 114 of the first casing 110 to be screw-fastened thereto. The substrates 811 and 831 of the main substrate module 81 and the power circuit module 83 and the bottom plate 510 may be secured at the same time to the upward extending portion 114 of the first casing 110 using the substrate fastening bolt B2.

Further, any one of the substrate fastening bolts B2 may be configured to act as grounding means for grounding the main circuit board module 81 and the power circuit board module 83. For example, as shown in FIG. 4, a copper-foil-shaped ground terminal 817 may be formed around a bolt hole 816 of the main circuit board module 81 through which the substrate fastening bolt B2 extends, and a head of the substrate fastening bolt B2 may be electrically connected to the ground terminal 817. A stem portion of the substrate fastening bolt 82 may be physically and electrically connected to the upward extending portion 114 of the first casing 110. Through such a simple configuration, the main circuit board module 81 may be effectively grounded to the first casing 110 by the substrate fastening bolt B2. Although not shown, a same type of a ground terminal (not shown) may be provided in any one of the plurality of bolt holes 833 formed in the substrate 831.

The lateral plate 520 may extend in the upward direction (U-direction) of the electric range 1 from a lateral surface edge of the bottom plate 510. The lateral plate 520 may serve to reinforce the rigidity of the entire base bracket 50. That is, the lateral plate 520 may suppress the plate-shaped bottom plate 510 from being bent or damaged by the weight of the internal components (e.g., the circuit board) or the external force. Further, the lateral plate 520 may also serve to protect the main circuit board module 81, the power circuit board module 83 and the ventilation module 90 from the external force applied to the bottom plate 510 in the lateral direction or front-rear direction (F-R direction). For that, the lateral plate 520 may be protruded to a position higher than a position in the vertical direction (U-D direction) of at least the substrate 811 and the substrate 831.

A supporting bracket 530 configured to support the first upper bracket 41 and the second upper bracket described above may be provided in or at a position corresponding to a center of the electric range 1. The supporting bracket 530 may extend parallel to a lateral surface of the substrate bracket 51 and a right surface with respect to the drawing. The supporting bracket 530 may be integrally formed with the substrate bracket 51. The supporting bracket 530 may be integrally formed with the substrate bracket 51, but may be configured to be easily decoupled therefrom by an external force. For example, a connection portion between the supporting bracket 530 and the substrate bracket 51 may have a relatively weak strength.

The supporting bracket 531 may include a plurality of supporting bosses 531 that extends in the upward direction (U-D direction) from a bottom surface a first upper bracket toward the first upper bracket 41 and the second upper bracket 42 described above. As mentioned above, left and rear ends of the first upper bracket 41 and right and rear ends of the second upper bracket 42 may be supported by and coupled to the supporting flanges 130.

The right end of the first upper bracket 41 and the left end of the second upper bracket 42 may be supported and secured by the supporting bosses 531 of the supporting bracket 530. To couple the right end of the first upper bracket 41 and the left end of the second upper bracket 42 to each other, a coupling hole 532 may be formed in or at an upper end of each supporting boss 531.

In the example shown in the drawing, a total of five supporting bosses 531 may be provided in the supporting bracket 530. Not all of the five supporting bosses 531 may be used in coupling the right end of the first upper bracket 41 and the left end of the second upper bracket 42. For example, only three supporting bosses 531 out of the five supporting bosses 531 may participate in the coupling between the first upper bracket 41 and the second upper bracket 42.

The other supporting bosses 531 not used in the coupling according to the illustrated example may be used when the supporting bracket 530 supports the first upper bracket 41 and the second upper bracket 42 at a different position in another example. More specifically, when applied to another example of an electric range having a larger size than the electric range described above, the supporting bracket 530 may be decoupled from the substrate bracket 51 and moved to another position for use. When the supporting bracket 530 is applied to the larger-sized electric range, the other supporting bosses 531 not used in the coupling in this example may be used. The supporting bracket 530 is configured to be applicable to other examples, thereby facilitating component sharing and reducing manufacturing costs.

As described above, the main circuit board module 81 and the power circuit board module 83 that form the control circuit board module 80 may be mounted on the base bracket 50. Although not limited thereto, the control circuit board module 80 may be understood as a higher concept including the above-discussed LED substrate module 84, the touch circuit board module 85, and wireless communication substrate module 86 rather than the main circuit board module 81 and the power circuit board module 83.

As shown in FIGS. 3 and 4, the main circuit board module 81 may include a controller configured to control overall operation of the electric range 1, and may be electrically connected to the touch circuit board module 85 and the LED substrate module 84 described above. Accordingly, the main circuit board module 81 may receive a user's manipulation through the touch circuit board module 85 or a user's manipulation through the wireless communication board module 86 wirelessly or wiredly. The main circuit board module 81 may transmit operational information and status information to the LED substrate module 84 and a user's mobile terminal (not shown).

In addition, on or at a center of the substrate 811 may be mounted a CPU provided as a controller, for example, a microcontroller, a microcomputer, or a microprocessor, a plurality of switching elements 812 configured to convert power received from the power circuit board module 83 into high-frequency power and supply the converted power to the working coils 312, 322, and 332, and a bridge circuit element 813. The plurality of switching elements 812 may serve as a power converting module.

A plurality of insulated gate bipolar transistors (IGBT) may be applied as the switching elements. However, the IGBT type switching element 812 is a heat-generating component. If such generated heat is not maintained at an appropriate level, a life span of the switch element 812 will be shortened or malfunction of the switch element is highly likely to occur.

Figure 6:
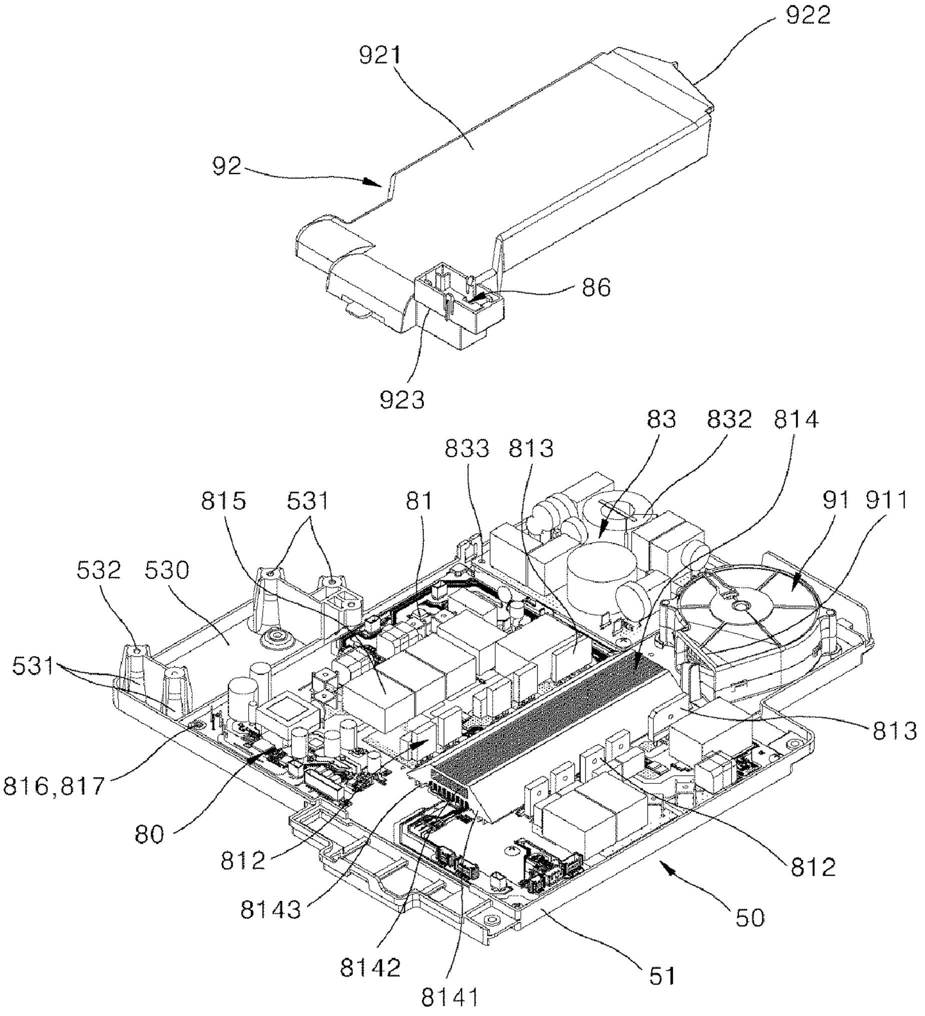
FIG. 6 is an exploded perspective view of an air guide cut away from FIG. 4.

As a means for cooling the switching element 812, a heat sink 814 configured to absorb heat generated in the plurality of switching elements 812 and the bridge circuit element 813 may be mounted on the substrate 811. As shown in FIG. 6, the heat sink 814 may include a hexahedral main body 8141 that extends along a frontward-rearward direction (F-R direction) of the electric range 1, and a plurality of heat dissipation fins 8143 that extends toward the substrate 811 from a lower surface of the body 8141.

An upper surface of the main body 8141 may be formed as a plane that extends parallel to the substrate 811, and both lateral surfaces of the main body 8141 may be formed as inclined surfaces having a downward inclination. The switching elements 812 and the bridge circuit element 813 may be attached to the lateral surfaces having the downward inclination. Accordingly, heat generated by the switching element 812 and the bridge circuit element 813 may be conducted through the lateral surfaces of the main body 8141.

A flow channel 8142 may be provided in the main body 8141, and extend in a straight line through front and rear surfaces of the main body 8141. Air may flow along the airflow channel 8142 to a ventilation fan-motor assembly 91, which will be described hereinafter. Heat from the switching elements 812 and the bridge circuit element 813 to be conducted may be partially absorbed by the air flow inside of the airflow channel 8142.

Concavities and convexities (or unevennesses) may be formed on an inner surface of the airflow channel 8142 and an upper surface of the main body 8141 to expand a contact area for the air flow. The unevenness may extend in a straight line along the air flow direction, that is, in the frontward-rearward direction (F-R direction) to minimize flow resistance.

The plurality of heat dissipation fins 8143 may protrude from the lower surface of the main body 8141 and extend in the straight line, and may be spaced a constant distance apart from each other. Accordingly, an air passage may be formed between each two neighboring heat dissipation fins adjacent to each other.

Some of the heat dissipation fins 8143, in particular, ones disposed adjacent to lateral sides of a lower surface of the substrate 811 may directly contact the substrate 811. The ones of the heat dissipation fins may serve to support the heat sink 814 as a whole.

In a state in which the plurality of switching elements 812 and the bridge circuit element 813 are attached to the heat sink 814, the heat sink 814 may be covered by an air guide 92, which will be described hereinafter. The heat sink 814 may be spatially separated from other circuit elements outside of the air guide 92, and a cooling passage only for the heat sink 814 may be formed by the air guide 92.

As shown in the drawing, a plurality of filter elements 815 may be disposed in or at a periphery of the air guide 92 to remove noise due to power output from the power circuit board module 83, which will be described hereinafter. The power circuit board module 83 may be disposed behind the main circuit board module 81. In general, the power circuit board module 83 may be modularized by mounting a high voltage device known as a switching mode power supply (SMPS) on the substrate 831. The power circuit board module 83 may convert external power into stable-state power before it is supplied to the switching elements 812.

A ventilation fan-motor assembly 91 of the ventilation module 90 may be disposed behind the main circuit board module 81, for example, on the base bracket 50 disposed behind the heat sink 814. The ventilation fan-motor assembly 91 may be configured to absorb external air drawn is via the air inlet hole 112 of the above-discussed first casing 110 and the through-hole 511 of the base bracket 50, and blow the air into the air guide 92.

A ventilation fan employed in the ventilation fan-motor assembly 91 is not limited; however, a sirocco fan may be employed in consideration of location and spatial restrictions in which the ventilation fan is mounted. When the sirocco fan is employed, external air may be absorbed in from a bottom of the sirocco fan in a direction parallel to a rotational shaft, and the air may be accelerated and discharged radially outward.

To improve air ventilation efficiency, an outlet end 911 of the ventilation fan may be directly connected to an inlet of the air guide 92, and external air forcedly blown by the ventilation fan may be drawn into the air guide 92 as a whole.

The air guide 92 may include a guide body 921 having a U-shaped cross-section and formed in a box shape in which a lower surface is open as a whole. The heat sink 814 may be mounted in an internal U-shaped space and the cooling passage dedicated to the heat sink 814 may be formed to blow the external air blown by the above-mentioned ventilation fan.

Figure 5:
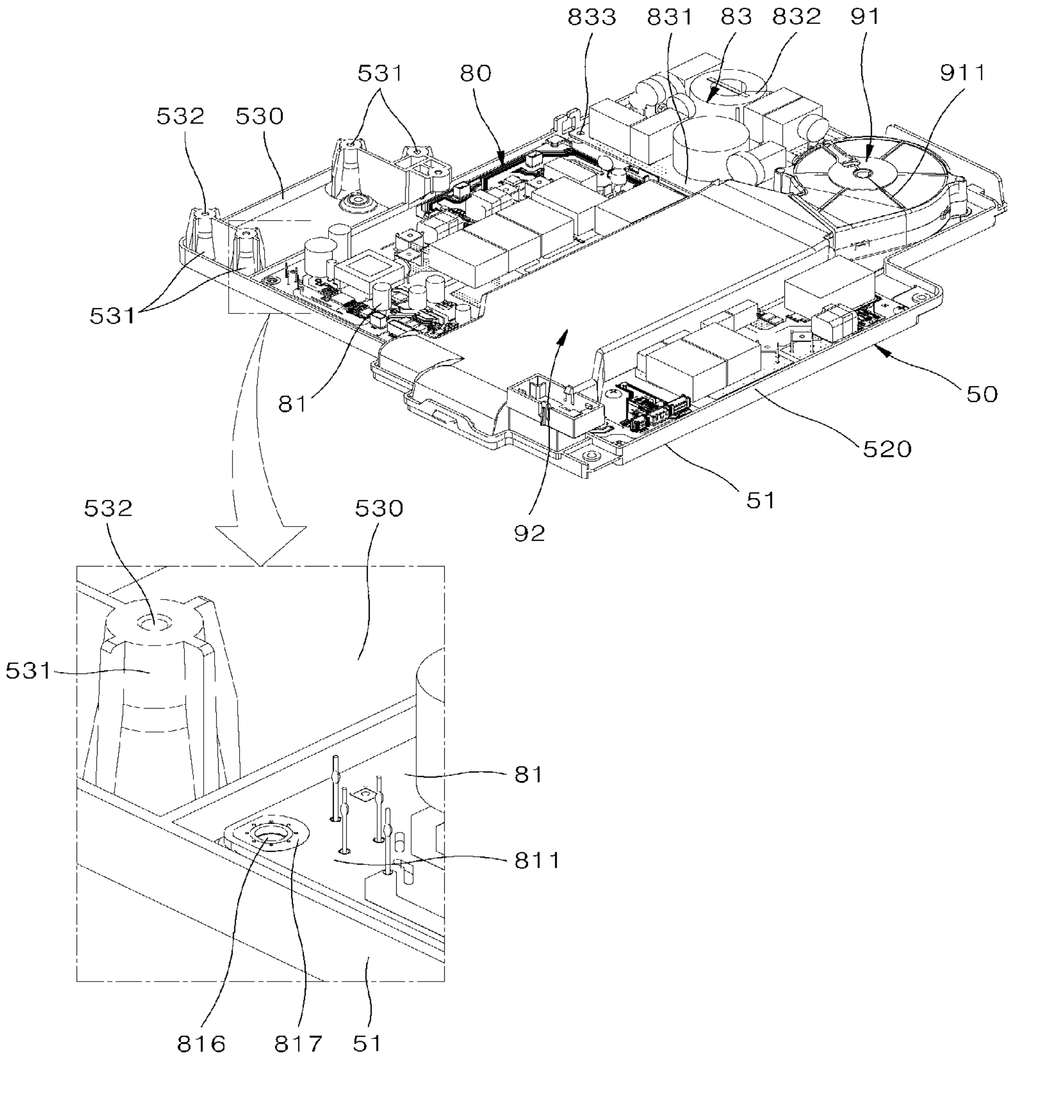
FIG. 5 is a perspective view showing a coupled state of a control circuit board module and a ventilation module with respect to a base bracket shown in FIG. 4.

The guide body 921 may correspond in shape to the heat sink 814. When the guide body 921 extends along the frontward-rearward direction (F-R direction) of the electric range 1, as shown in FIG. 5, the heat sink 815 may be correspondingly arranged in a shape that extends along the frontward-rearward direction (F-R direction) of the electric range 1.

A rear surface of the guide body 921 may be partially open, and the open rear surface may serve as an air introduction hole 922 through which external air blown by the ventilation fan may be introduced. Unlike the rear surface, a front surface and a lateral surface of the guide body 921 may be completely closed, and may perform a function of a partition wall configured to prevent the introduced external air from leaking to the outside.

The external air introduced into the cooling passage formed in the guide body 921 may flow forward while performing heat-exchange with the heat sink 814, and a flow direction of the external air may be guided by the guide body 921 to finally flow in the downward direction (D-direction), thereby finally being discharged to the outside through the air outlet hole 111 of the first casing 110.

A substrate mounting portion or mount 923 may be integrally formed with a front surface of the guide body 921, for example, a front left area of a front surface. The substrate mounting portion 923 may protrude from the front left area in the upward direction.

The substrate mounting portion 923 may accommodate the above-mentioned wireless communication substrate module 86. A position of the substrate mounting portion 923 may be determined as a position which may minimize the influence of high-frequency noise generated by the heating portion 30 and the switching elements 812. A position which is farthest from the heating portion 30 and the switching elements 812 may be selected.

Hereinafter, referring to FIGS. 7-12, a heating portion provided in an electric range according to an embodiment will be described. However, in FIG. 7-12, the first heating portion 31 among the first to third heating portions 31, 32 and 33 will be exemplarily described with reference. Unless otherwise described below, the configuration of the first heating portion 31 is similarly applicable to the second heating portion 32 and the third heating portion 33, and respective description has been omitted.

Figure 7:
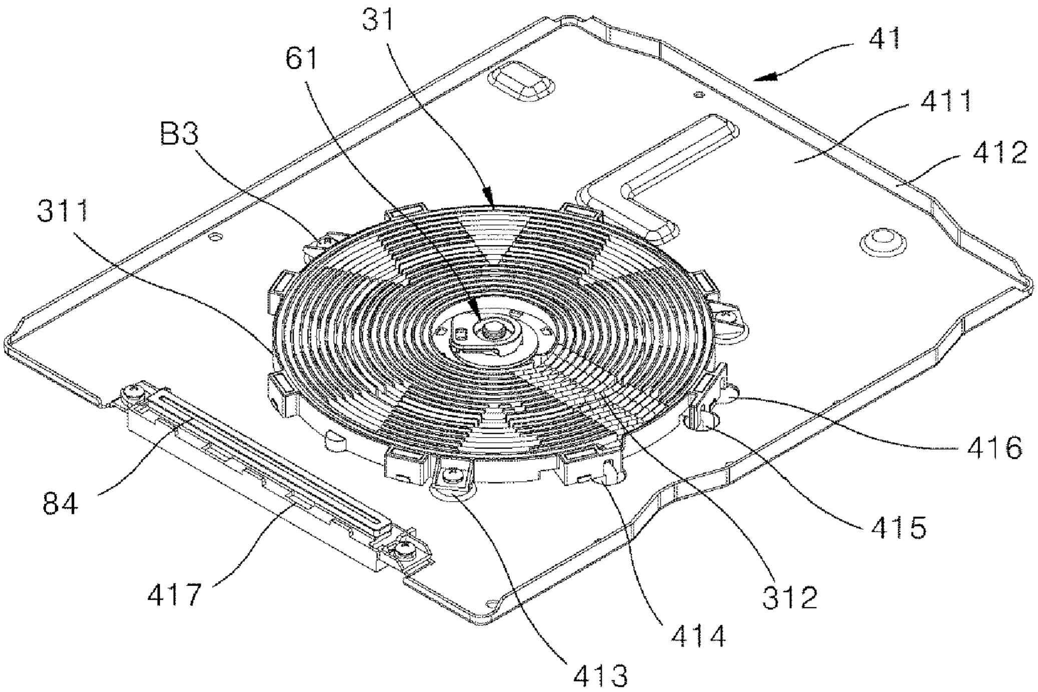
FIG. 7 is an upward perspective view showing a state in which the first heating portion shown in FIG. 2 is coupled to a first upper bracket.
Figure 8:
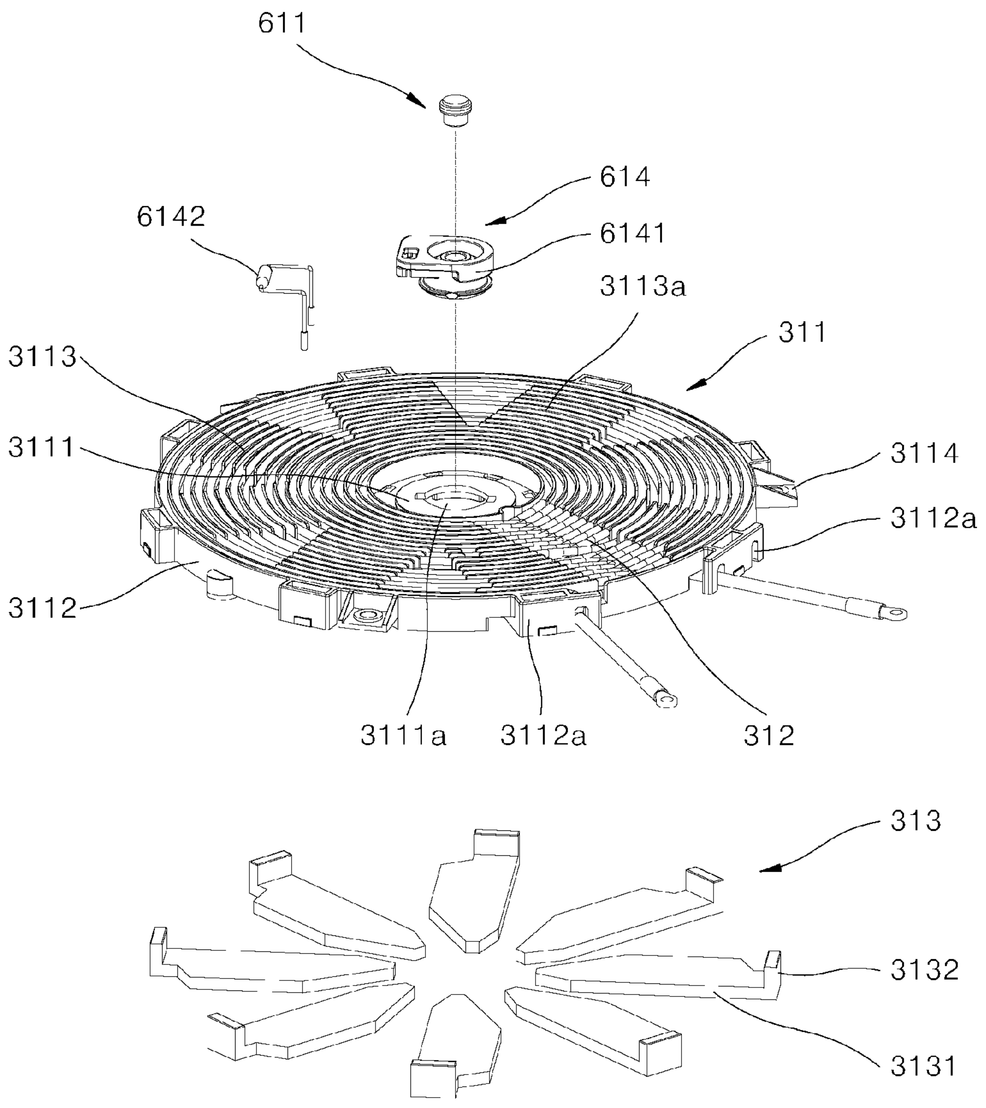
FIG. 8 is an exploded perspective view of the first heating portion shown in FIG. 7.
Figure 9:
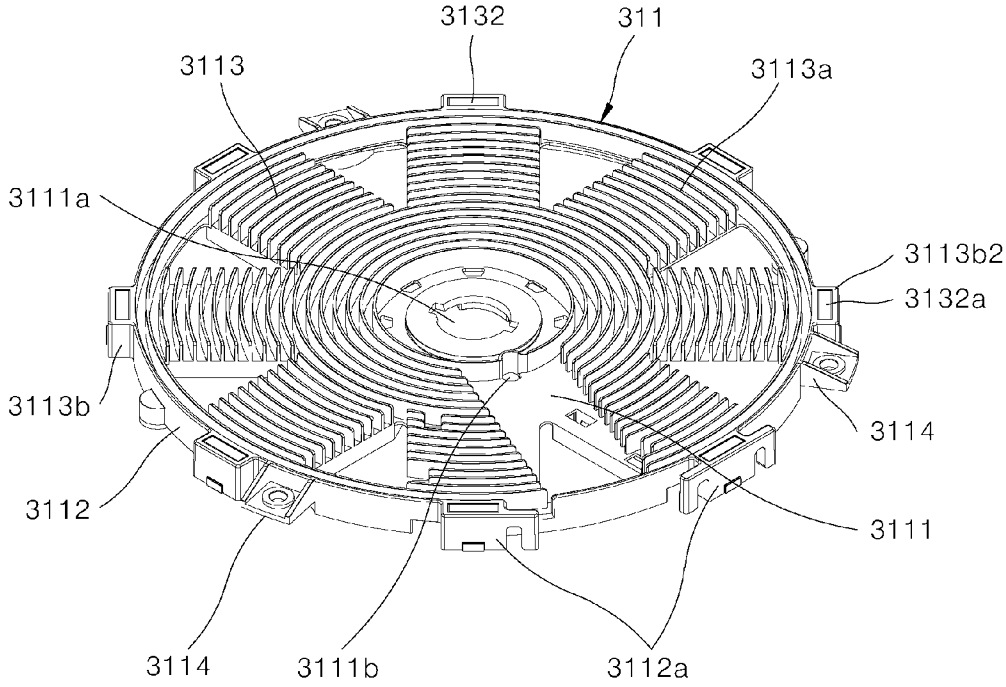
FIGS. 9 and 10 are an upward perspective view and a downward perspective view showing a state in which a ferrite core is coupled to a core frame shown in FIG. 7.
Figure 10:
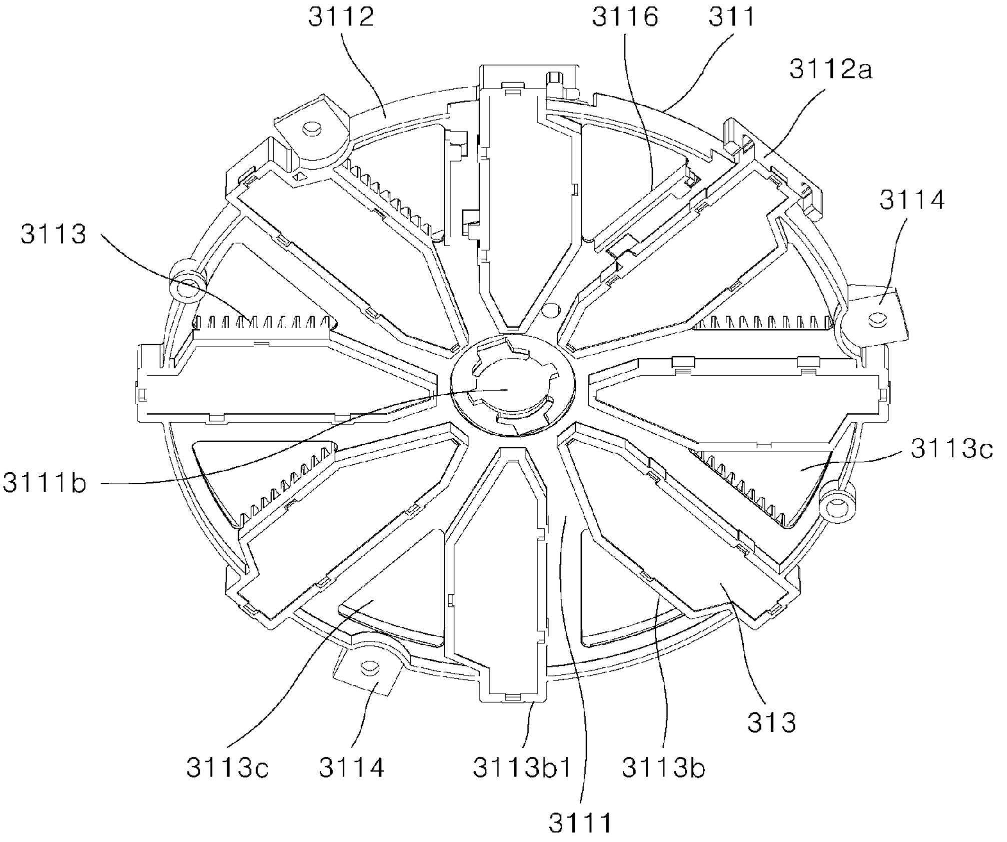

Referring to FIGS. 7 to 9, the first heating portion 31 may include working coil 312, core frame 311, and ferrite core 313. In FIGS. 7 to 10, in order to clearly explain the structure of the first heating portion 31, the working coil 312 has been omitted. However, as the first heating portion 31 on which the working coil 312 is wound is shown in other drawings, for example, FIG. 12 and FIG. 13, there will be no difficulty in understanding the embodiments.

As shown in the drawings, the core frame 31 may be formed in a hollow cylindrical shape with an empty interior, and a lower surface thereof may be entirely open. The working coil 312 may be spirally wound on an upper surface of the disk portion 3111 forming the upper surface of the core frame 311. To allow the working coil 312 to be wound in the radial direction, a guide rail 3113 may be provided on the upper surface of the disk portion 3111. The guide rail 3113 may extend in a spiral shape from a radial outer side of the disk portion 3111 toward a radial direction (r-direction) inner side of the disk portion 3111.

The guide rail 3113 may be formed to have a predetermined height in the upward direction (U-direction) from the upper surface of the disk portion 3111, and a radial track **3113*a* may be formed between neighboring guide rails 3113 to accommodate the working coil 312. A protruding height of the guide rail 3113 may be larger than a diameter of the working coil 312 so as not to expose the working coil 312 in the upward direction (D-direction). When the working coil 312 is wound a plurality of times in multiple layers, the height of the guide rail 3113 may be formed to be equal to the number of layers of the working coil 312. An upper end of the guide rail 3113 may be in direct contact with a lower surface of the cover plate 20 to support a load of a heating target which is placed on the upper surface of the cover plate 20**.

The disk portion 3111 of the core frame 311 may include a through hole **3113*c* formed therethrough in the vertical direction (U-D direction). The through hole 3113*c* may penetrate even the guide rail 3113. That is, the through hole 3113 may facilitate communication between the inside and the outside of the core frame 311**.

The through hole **3113*c* may be formed between core accommodation portions 3113*b*, which will be described hereinafter. More specifically, the disk portion 3111 formed between the neighboring core accommodation portions 3113*b* and the ferrite core 313 and the guide rail 3113 may be at least partially open in the vertical direction (U-D direction) by the through hole 3113*c***.

FIGS. 7 to 10 exemplarily show an embodiment in which a total of eight core accommodation portions **3113*b* and the ferrite core 313 are provided, with a total of corresponding eight through holes 3113*c***. Embodiments are not limited thereto, but will be described based on the embodiment in which a total of eight through holes are provided.

As shown in the drawings, each through hole **3113*c* may be provided in a polygonal shape that gradually increases in width while extending outward in the radial direction (r-direction). For example, the through hole 3113*c* may be provided in a sector shape. The shape of the through-shape 3113*c* may be selected as a shape avoiding the ferrite core 313 and the shape of the core accommodation portion 3113*b*, which will be described hereinafter. The through hole 3113c may be formed as close as possible to edge wall 3112 of the core frame 311, which will be described hereinafter, so that an area of the each through hole 3113*c*** may be secured to the maximum.

As described above, the inside and the outside of the core frame 311 may be in communication by the through hole **3113*c*. Accordingly, the through hole 3113*c* may function as a passage through which heat transferred from the cover plate 20 and heat generated from the working coil 312 may escape to the outside without being trapped inside of the core frame 311**.

A cable guide wall 3116 that protrudes in the downward direction (D-direction) along a circumference of the through hole may be provided at a lower surface of the disk portion 3111 of the core frame 311. The cable guide wall 3116 may separately guide lead wires of the first plate temperature sensor 611 that extend toward the outside of the core frame 311 and the outgoing wire of the working coil 312, and may function as an extension passage thereof. The extension passages of the lead wires and outgoing wires may be defined together by the cable guide wall 3116 and the accommodation wall of the core accommodation portion 3113*b*.

The working coil 312 wound spirally around the guide rail 3113 and configured to generate a magnetic field using high-frequency power may be made of Ritz wire with excellent durability, for example; however, embodiments are not limited thereto.

A circular region may be formed in a center of the disk portion 3111 provided in the core frame 311 in which the guide rail 3113 is not formed, in other words, the working coil 312 is not wound. A coupling hole 3111*a* may be formed in a center of the circular region, which passes through the disk portion 3111 in the vertical direction (U-D direction).

The first sensor holder 614 may be coupled to the coupling hole 3111*a*. As described above, the first plate temperature sensor 611 and the first thermal fuse 6142 that form the first temperature sensing portion 61 may be disposed in the first sensor holder 614.

As shown in FIG. 8, the first sensor holder 614 may include a first holder 6141 configured to hold the first plate temperature sensor 611 and a second holder configured to hold the first thermal fuse 6142.

The first holder 6141 may be formed in a hollow cylindrical shape and the second holder may be formed in a box shape coupled to a lateral surface of the first holder 6141. The first holder 6141 and the second holder may be integrally formed with each other and made of a material having a predetermined elasticity or a material having heat resistance suitable for a high-temperature environment so as to elastically support the first plate temperature sensor 611 and the first thermal fuse 6142.

As shown in FIG. 8, a lower end of the first holder 6141 may partially pass through the coupling hole 3111*a* in the installation process of the first holder 6141 in the coupling hole 311*a*, and may be exposed to the lower surface of the disk portion 3111. The first plate temperature sensor 611 coupled to a central inner surface of the first holder 6141 may be configured to sense the temperature of the lower surface of the cover plate 20. The first plate temperature sensor 611 may be in direct contact with the lower surface of the cover plate 20 to sense the temperature of the cover plate 20. A sensing surface formed on an upper end of the first plate temperature sensor 611 may protrude in the upward direction (D-direction) to directly contact the lower surface of the cover plate 20.

The lead wire (not shown) of the first plate temperature sensor 611 may have one or a first end connected to a lower end of the first plate temperature sensor 611 and the other or a second end electrically connected to the control circuit board module 80 after passing through cable holder 3112*a* formed in the edge wall 3112 of the core frame 311.

The first thermal fuse 6142 disposed in the second holder may serve as a safety device configured to open a circuit when the temperature of the cover plate 20 exceeds a predetermined threshold temperature, that is, when overheating occurs. The first thermal fuse 6142 may be classified into a recovery type that automatically returns to an original state when the temperature falls below a predetermined value after the circuit is open due to the occurrence of overheating, and a non-recovery type that does not return to the original state. The first thermal fuse 6142 applied to this embodiment may be the recovery type.

Similar to the first plate temperature sensor 611, the pair of lead wires (not shown) provided in the first thermal fuse 6142 may be electrically connected to the control circuit board module 80 after penetrating the cable holder 3112*a* formed in the edge wall 3112 of the core frame 311.

A coil hole 3111*b* at the inner end of the guide rail 3113, which is the point at which the guide rail ends at the inside may be formed to guide the one end of the working coil 312 or the outgoing wire of the working coil 312 in the downward direction (D-direction).

As shown in FIG. 8, the plurality of ferrite cores 313 may be disposed on a lower surface of the disk portion 3111 provided in the core frame 311. The core accommodating portions 3113*b* may be radially disposed on the lower surface of the core frame 311.

As shown in the drawings, the core accommodating portion 3113*b* may have a polygonal box shape with an entirely open lower surface. Each of the core accommodating portions 3113*b* may be defined by an accommodating wall that protrudes in the downward direction (D-direction) from the lower surface of the disk portion 3111 of the core frame 311.

The ferrite core 313 having the same shape as an inner shape of the core accommodating portion 3113*b* may be accommodated in each core accommodating portion 3113*b*. Accordingly, the number of core accommodating portions 3113*b* may be the same as the number of ferrite cores 313.

The core accommodating portion 3113*b* may be formed so that the plurality of ferrite cores 313 disposed radially may be spaced a predetermined distance apart from each other in a circumferential direction of the core frame 311. An inner end of each core accommodating portion 3113*b* and an inner end of each ferrite core 313 may be formed to gradually decrease in width while extending in the inward direction to secure such a distance.

A radial (r-direction) outer end 3113*b*1 of the core accommodation portion 3113*b* may protrude to the outside of the edge wall 3112. As will be described hereinafter, the radial (r-direction) outer end 3131*b* and the extended bent portion 3132 of the ferrite core 313 may extend outward in the radial direction (r-direction) over the edge wall 3112, in order to increase a volume of the ferrite core 313. To accommodate the radial (r-direction) outer end 3131*b* and the extended bent portion 3132 of the ferrite 313, the radial (r-direction) outer end 3113*b* 1 of the core accommodation portion 3113*b* may protrude outward in the radial direction of the edge wall 3112.

In addition, an exposure hole 3113*b*2 open in the upper direction (U-direction) may be provided on an upper surface 3131*c* of the outer end 3113*b*1 of the core accommodation portion 3113*b*. For example, the exposure hole 3113*b*2 may have a shape corresponding to a shape of the upper surface 3132*a* of the extended bent portion 3132, and may be a rectangular open hole. The exposure hole 3113*b*2 may be configured to expose the upper end 3132*a* of the extended bent portion 3132 to the outside at least partially. Accordingly, a height H of the extended bent portion 3132 may be secured as much as possible as will be described hereinafter, and it may be possible to easily check whether the extended bent portion 3132 and the ferrite core 313 are accurately placed in correct positions. A chamfer may be formed on an edge of the upper surface 3132*a* of the extended bent portion 3132 to facilitate entry of the upper end of the extended bent portion 3132 when assembling the ferrite core 313. The configuration related to the specific shape of the ferrite core 313 including the extended bent portion 3132 will be described hereinafter with reference to FIGS. 11 and 12.

A downward (D-direction) end of the core accommodation portion 3113*b* may be in direct contact with the first upper plate 411 of the above-described first upper bracket 41. Through this substrate, a load of the heating target transmitted to the disk portion 3111 may be transmitted to the core accommodation portion 3113*b* along the guide rail 3113, and finally transmitted to the first upper plate 411 of the first upper bracket 41. In other words, the core accommodation portion 3113*b* may have a dual function of accommodating the ferrite core 313 and supporting an external load inside the core frame 311.

The cylinder-shaped edge wall 3112 extended in the downward direction (D-direction) may be integrally formed with the radially (r-direction) outer end of the disk portion 3111 of the core frame 311. The cylinder-shaped edge wall 3112 may be configured to define the internal space of the core frame 311 and it may be integrally formed with the disk portion 3111.

A plurality of fastening tabs 3114 configured to fasten the core frame 311 to the first upper bracket 41 as described above may be provided on the outside of the edge wall 3112. Each fastening tab 3114 may have a fastening hole through which a fastening means, for example, a heating portion fastening bolt B3, extends.

In addition, the cable holder 3112*a* may be provided in the outside of the edge wall 3112, to guide the lead wire of the first plate temperature sensor 611, the lead wire of the first thermal fuse 6142, and the outgoing wire of the working coil 312, for example, to be extended outside of the core frame 311.

Figure 11:
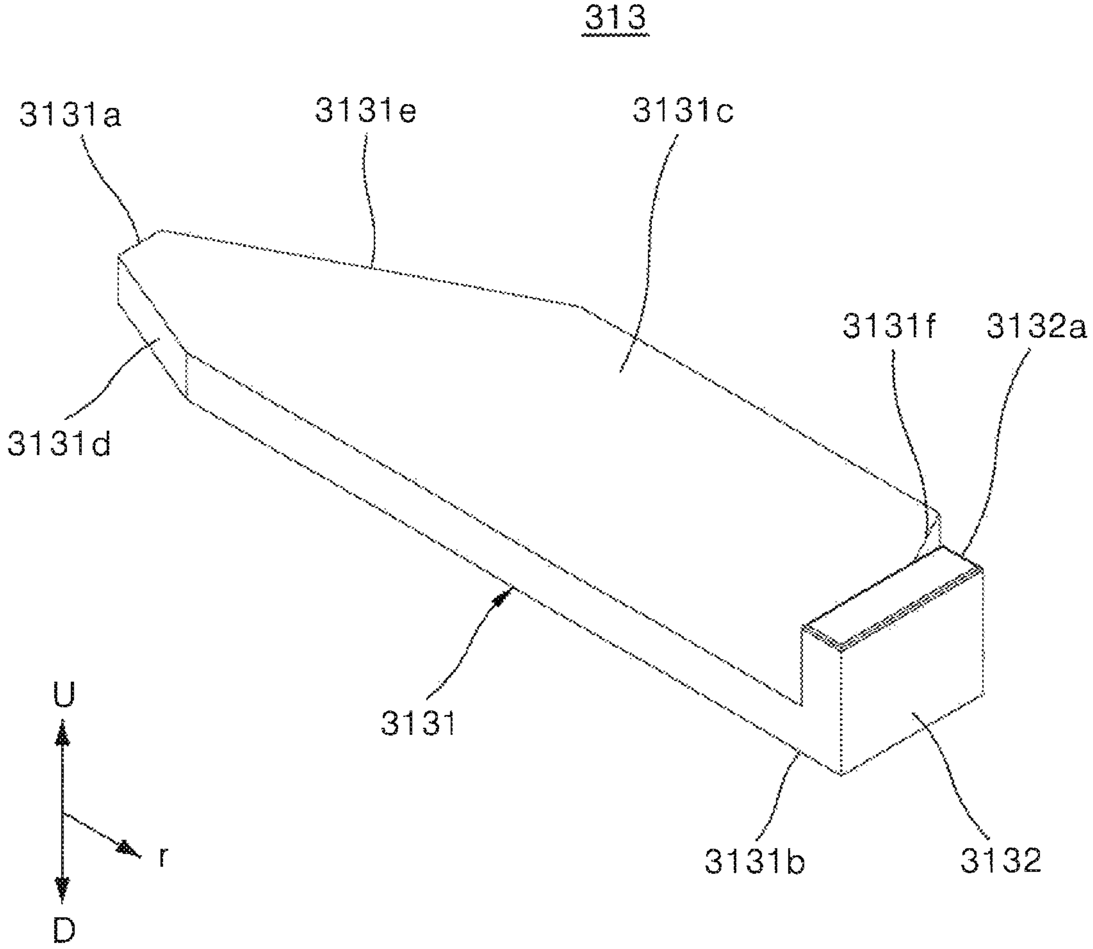
FIG. 11 is a perspective view of a ferrite core provided in the first heating portion according to an embodiment.
Figure 12:
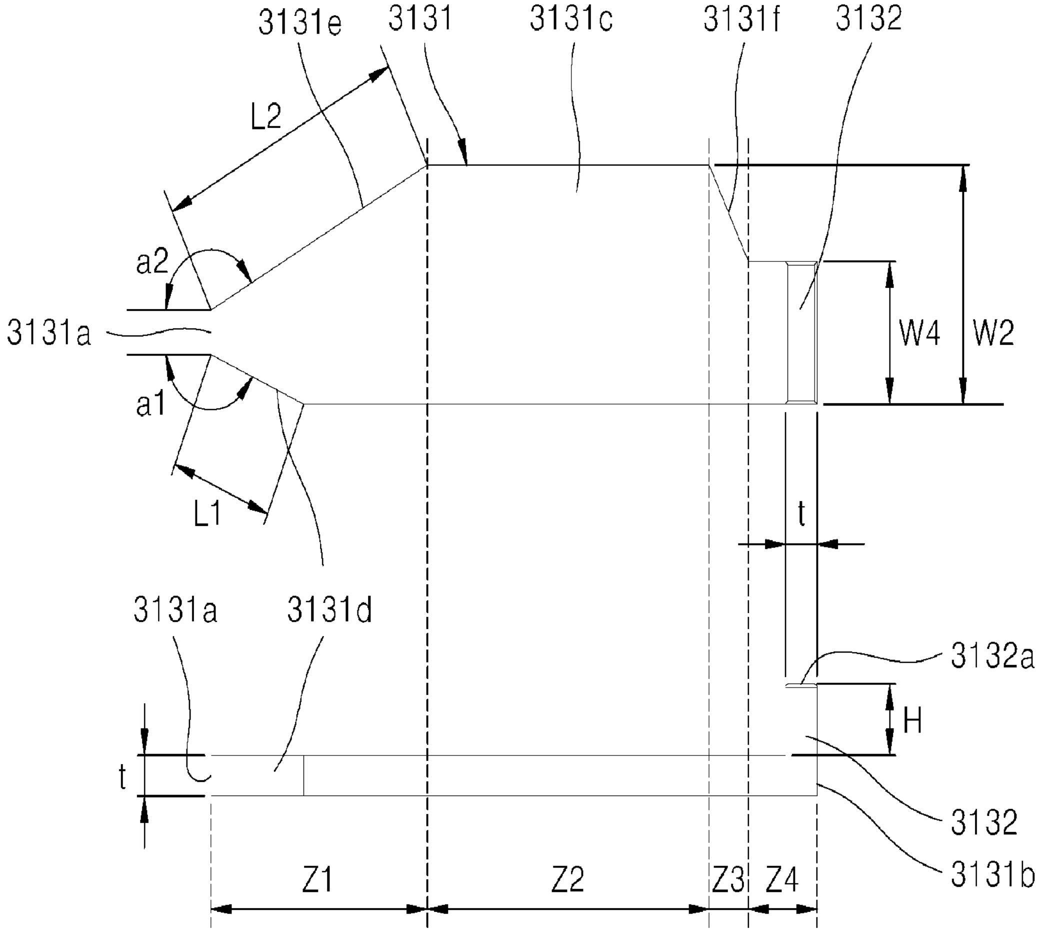
FIG. 12 is a plane view and a front view of the ferrite core shown in FIG. 11.

Referring to FIGS. 11 and 12, the ferrite core 313 provided in the electric range 1 according to an embodiment will be described.

As shown in FIGS. 11 and 12, the ferrite core 313 may include a plate-shaped core body 3131 having an inner end 3131*a* directed toward the center of the core frame 311 and an outer end 3131*b* directed toward the radial (r-direction) outer surface of the core frame 311. A thickness t of the core body 3131 may be maintained constant while extending from the inner end 3131*a* to the outer end 3131*b*. More specifically, as there is a clear limit to the size, particularly the height, of the first heating portion 31 and the core frame 311, the thickness of the ferrite core 313 affecting the height of the core frame 311 needs to be maintained below a predetermined level. Thus, the thickness t of the core body 3131 of the ferrite core 313 may be maintained constant as a whole.

However, the thickness t may be maintained constant, but in order to increase the volume, the ferrite core 313 may be formed to have an asymmetric shape based on an arrangement direction on the core frame 311, that is, the radial direction (r-direction) of the core frame 311 or a longitudinal direction of the ferrite core 311.

More specifically, as shown in FIG. 12, the core body 3131 may include a first region (Z1) a width of which gradually expands in a direction perpendicular to the radial direction (r-direction) while extending along the radial direction from the inner end 3131*a* of the core body 3131, and a second region Z2 continuously formed with respect to the first region Z1 and a width W2 of which is constant in a direction perpendicular to the radial direction (r-direction).

The first region Z1 may have a shape having the width that gradually expands toward the outside in the radial direction (r-direction) to secure a distance between each two inner ends 3131*a* of the ferrite cores 313. In other words, the first region Z1 may have a sharp shape in which the width of the inner end 3131*a* is the smallest.

For example, both lateral surfaces of the first region Z1 may extend linearly. A first lateral surface 3131*d* and a second lateral surface 3131*e* which correspond to both lateral surfaces may have a predetermined expansion angle, and may be gradually spaced a predetermined distance apart from each other.

The first lateral surface 3131*d* may extend to the second region Z2, with a first expansion angle al with respect to the radial direction (r-direction), and the second lateral surface 3131*e* may extend to the second region Z2, with a second expansion angle a2 with respect to the radial direction (r-direction). The first expansion angle al may be equal to or greater than the second expansion angle a2.

A length L2 of the second lateral surface 3131*e* may be greater than a length L1 of the first lateral surface 3131*d* so that the width of the first region Z1 may expand in the asymmetrical form based on the radial direction (r-direction). Using the asymmetric form, the width of the second region Z2 in the direction perpendicular to the radial direction (r-direction) may be wider than in the prior art, and thus, the volume of the ferrite core 313 may be larger. The second region Z2 may be a region having a constant width in a direction perpendicular to the radial direction (r-direction).

As described above, the through hole may be formed between neighboring ferrite cores 313. The reason that the width of the second region Z2 of the ferrite core 313 is maintained constant may be to locate the second region Z2 more outward than the first region Z1 and more inward than a fourth region Z4 in the radial direction (r-direction), and may be to secure the areas of the through holes formed on both sides of the second region Z2 in the circumferential direction as wide as possible. In other words, as the width W2 of the second region Z2 increases larger, the area of the through hole may be inevitably reduced by that amount.

As shown in FIG. 12, the core body 3131 may further include a third region Z3 continuously formed with the outer surface of the second region Z2 and having the width gradually decreasing in a direction perpendicular to the radial direction (r-direction), and a fourth region Z4 continuously formed with respect to the third region Z3 and having the width which is constant in the direction perpendicular to the radial direction (r-direction). The fourth region Z4 may extend to the radially outer end 3131*b* of the core body 3131.

Similar to the first region Z1, both lateral surfaces of the third region Z3 may be extended linearly. The lateral surfaces of the third region Z3 may be spaced a predetermined distance from each other, and the distance may gradually decrease. For example, one of the lateral surfaces 3131*f* may extend to the fourth region Z4, with a predetermined reduction angle in the radial direction (r-direction).

As described above, the fourth region Z4 may be an area that produces outward in the radial direction (r-direction) after at least partially passing through the edge wall 3112 of the core frame 311. The width W4 of the fourth region Z4 in a direction perpendicular to the radial direction (r-direction) may be smaller than the width W2 of the second region Z2 so that the width of the protruding area may be minimized.

The core body 3131 may further include an extended bent portion 3132 that protrudes upward (U-direction) from an upper surface of the core body 3131. For example, the extended bent portion 3132 may be formed in a shape of a quadrangular pole which is bent and extends vertically from the upper surface 3131*c* of the fourth region Z4. The extended bent portion 3132 may be integrally formed with the upper surface 3131*c* of the fourth region Z4.

The extended bent portion 3132 may be formed in an outer end of the core body 3131 to minimize interference with the working coil 312, and may be disposed at a position that extends outward in the radial direction after passing the edge wall 3112 as mentioned above. In this way, the volume of the ferrite core 313 may be additionally secured by additionally providing the extended bent portion 3132 which extends upward.

To secure the maximum volume of the extended bent portion 3132, the width of the extended bent portion 3132 which is perpendicular to the radial direction (r-direction) may be set to be equal to the width W4 of the fourth region Z4. In addition, the height H of the extended bent portion 3132 that protrudes from the upper surface of the core body 3131 may be larger than the thickness t of the core body 3131.

The height H of the extended bent portion 3132 may be determined for the upper end of the extended bent portion 3132 not to pass through the exposure hole 3113*b*2 of the core accommodation portion 3113*b*. This is to prevent the ferrite core 313 from being damaged by a load directly transmitted to the extended bent portion 3132 through the cover plate 20 when the upper end of the extended bent portion 3132 extends to a position higher than the exposure hole 3113*b*2 after passing through the exposure hole.

Chamfers may be formed in four corners of the upper surface 3132*a* of the extended bent portion 3132, respectively, to facilitate convenience of entering and assembling into the exposure hole 3113*b*2. Through the chamfers, an effective area of the top surface 3132*a* of the extended bent portion 3132 may be maintained substantially smaller than the inner area of the exposure hole 3113*b*2.

Embodiments disclosed herein provide an electric range that may optimize a shape of each ferrite core without increasing the number of the ferrite cores, thereby effectively increasing output of a heating portion or heater. Further, embodiments disclosed herein provide an electric range that may secure a maximum area of a through hole that facilitates communication between an inside and outside of a core frame, thereby preventing overheating of the heating portion and decreasing a use time of the heating portion.

Advantages are not limited to the above advantages, and other advantages that are not mentioned above can be clearly understood from the description and can be more clearly understood from the embodiments set forth herein. Additionally, advantages may be realized via means and combinations thereof that are described in the appended claims.

An electric range according to an embodiment may include a cover plate on which a heating target is disposed; and a heating portion or heater comprising a working coil to which high-frequency power is applied and configured to heat the heating target using a magnetic field generated from the working coil. The heating portion may include a core frame having an upper surface around which the working coil is wound; and a plurality of ferrite cores radially disposed under the core frame along a direction toward a radial outside from a center of the core frame. The core frame may comprise a through hole formed between neighboring ones of the plurality of ferrite cores and configured to facilitate communication between an inside and an outside of the core frame. The plurality of ferrite cores may have an asymmetrical shape based on a radial direction, and the plurality of ferrite cores may have a same shape and a same size. Accordingly, the shape of the separate ferrite core may be optimized and output of the heating portion may be improved effectively.

The plurality of ferrite cores may be arranged at equal intervals, respectively. The ferrite core may include a plate-shaped core body having an inner end directed toward a center of the core frame and an outer end directed toward a radial outside of the core frame.

A thickness of the core body may be maintained constant while proceeding from the inner end to the outer end along the radial direction. The core body may include a first region having a width gradually extended in a direction perpendicular to the radial direction while proceeding from the inner end along the radial direction, and a second region continuously formed in the radial outside with respect to the first region and having a width maintained constant in a direction perpendicular to the radial direction. A through hole may be formed more outside than the first region with respect to the radial direction.

The first region may include a first lateral surface and a second lateral surface that are gradually spaced apart from each other while proceeding from the inner end toward the outside in the radial direction. The first lateral surface may be extended from the inner end linearly and forming a first extension angle with respect to the radial direction, and the second lateral surface may be extended from the inner end linearly and forming a second extension angle with respect to the radial direction. The first extension angle may be equal to or larger than the second extension angle. A length of the second lateral surface may be larger than a length of the first lateral surface.

The core body may include a third region continuously formed with the radial outside with respect to the second region and having a width gradually reduced in a direction perpendicular to the radial direction, and a fourth region continuously formed with the radially outer side with respect to the third region and having a width maintained constant in a direction perpendicular to the radial direction. The through hole may be formed between the first region and the fourth region with respect to the radial direction.

The ferrite core may further include an extended bent portion that protrudes upward from an upper surface of the core body, and the extended bent portion may be integrally formed with the core body. The extended bent portion may be integrally formed with the fourth region of the core body, and a width of the extended bent portion in a direction perpendicular to the radial direction may be equal to the width of the fourth region in a direction perpendicular to the radial direction. A protrusion height of the extended bent portion that protrudes from the upper surface of the core body may be greater than the thickness of the core body.

The core frame may include a disk portion including an upper surface around which the working coil is wound and in which the through hole is formed, and an edge wall that extends downward from a radial outer end of the disk portion. The extended bent portion and the fourth region of the core body may extend outward with respect to a radial direction after at least partially passing through the edge wall. The extended bent portion may be disposed in a radially outer side of the edge wall after passing through the edge wall as a whole.

The core frame may further include a core accommodation portion that protrudes downward from a lower surface of the disk portion and configured to accommodate the ferrite core. The extended bent portion may be disposed in a radially outer end of the core accommodation portion, and the radially outer end of the core accommodation portion may protrude outward with respect to a radial direction of the edge wall after passing through the edge wall.

An exposure hole may be provided in an upper surface of the radially outer end of the core accommodation portion, the exposure hole may be at least partially open upward, and the upper end of the extended bent portion may be exposed outside through the exposure hole.

Embodiments disclosed herein may have at least the following advantages and effects. The electric range according to embodiments disclosed herein may optimize the shape of each ferrite core without increasing the number of the ferrite cores, thereby effectively increasing output of a heating portion. In addition, the electric range according to embodiments disclosed herein may secure a maximum area of the through hole that facilitates communication between the inside and outside of the core frame, thereby preventing overheating of the heating portion and decreasing a use time of the heating portion.

Embodiments are described above with reference to a number of illustrative embodiments thereof. However, the embodiments are not intended to be limited to the embodiments and drawings set forth herein, and numerous other modifications and embodiments may be devised by one skilled in the art. Further, the effects and predictable effects based on the configurations are to be included within the range though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower" and "upper", for example, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electric range, comprising:

a cover plate on which a heating target is disposed; and a heater comprising a working coil to which high-frequency power is applied and configured to heat the heating target using a magnetic field generated from the working coil, wherein the heater comprises:

a core frame having an upper surface around which the working coil is wound; and a plurality of ferrite cores radially disposed under the core frame and extending in a radially outward direction from a center of the core frame, wherein the core frame comprises a through hole formed between neighboring ones of the plurality of ferrite cores and configured to facilitate communication between an inside and an outside of the core frame, wherein the plurality of ferrite cores has an asymmetrical shape based on the radial direction, wherein the plurality of ferrite cores has a same shape and a same size, wherein each of the plurality of ferrite cores comprises a plate-shaped core body having an inner end directed toward the center of the core frame and an outer end directed in the radially outward direction of the core frame, wherein the core body comprises:

a first region having a width that gradually increases in a direction perpendicular to the radial direction from the inner end along the radial direction;

a second region continuously formed in the radially outward direction with respect to the first region and having a width which is constant in a direction perpendicular to the radial direction;

a third region continuously formed in the radially outward direction with respect to the second region and having a width that gradually decreases in a direction perpendicular to the radial direction; and a fourth region continuously formed in the radially outward direction with respect to the third region and having a width that remains constant in a direction perpendicular to the radial direction, wherein the through hole is formed further outside than the first region with respect to the radial direction, wherein a width of the through hole in a circumferential direction gradually increases in the radial direction, and wherein the through hole is formed between the first region and the fourth region with respect to the radial direction.

2. The electric range of claim 1, wherein the plurality of ferrite cores is arranged at equal intervals, respectively.

3. The electric range of claim 1, wherein a thickness of the core body is constant from the inner end to the outer end along the radially outward direction.

4. The electric range of claim 1, wherein the first region comprises a first lateral surface and a second lateral surface which are gradually spaced apart from each other in the radially outward direction.

5. The electric range of claim 4, wherein the first lateral surface extends from the inner end linearly and forms a first extension angle with respect to the radial direction, wherein the second lateral surface extends from the inner end linearly and forms a second extension angle with respect to the radial direction, and wherein the first extension angle is equal to or larger than the second extension angle.

6. The electric range of claim 5, wherein a length of the second lateral surface is larger than a length of the first lateral surface.

7. The electric range of claim 1, wherein the each of plurality of ferrite cores further comprises:

an extended bent portion that protrudes upward from an upper surface of the core body, and wherein the extended bent portion is integrally formed with the core body.

8. The electric range of claim 7, wherein the extended bent portion is integrally formed with the fourth region of the core body, and wherein a width of the extended bent portion in a direction perpendicular to the radial direction is equal to the width of the fourth region in a direction perpendicular to the radial direction.

9. The electric range of claim 7, wherein a protrusion height of the extended bent portion is greater than a thickness of the core body.

10. The electric range of claim 7, wherein the core frame comprises:

a disk portion comprising an upper surface around which the working coil is wound and in which the through hole is formed; and an edge wall that extends downward from a radially outer end of the disk portion, and wherein the extended bent portion and the fourth region of the core body extend outward with respect to the radial direction after at least partially passing through the edge wall.

11. The electric range of claim 10, wherein the extended bent portion is disposed at a radially outer side of the edge wall after passing through the edge wall.

12. The electric range of claim 11, wherein the core frame further comprises a plurality of core accommodation portions that protrudes downward from a lower surface of the disk portion and configured to accommodate the plurality of ferrite cores, respectively, wherein the respective extended bent portion is disposed in a radially outer end of the respective core accommodation portion, and wherein the radially outer end of the core accommodation portion protrudes outward with respect to a radial direction of the edge wall after passing through the edge wall.

13. The electric range of claim 12, wherein an exposure hole is provided in an upper surface of the radially outer end of the core accommodation portion, wherein the exposure hole is at least partially open upward, and wherein the upper end of the extended bent portion is exposed outside through the exposure hole.

14. An electric range, comprising:

a cover plate on which a heating target is disposed; and a heater comprising a working coil to which high-frequency power is applied and configured to heat the heating target using a magnetic field generated from the working coil, wherein the heater comprises:

a core frame having an upper surface around which the working coil is wound; and a plurality of ferrite cores disposed at equal intervals under the core frame and extending in a radially outward direction from a center of the core frame, wherein the core frame comprises a plurality of through holes formed between the plurality of ferrite cores, respectively, wherein the plurality of ferrite cores each has an asymmetrical shape with respect to a radially extending longitudinal center line, wherein each of the plurality of ferrite cores comprises a plate-shaped core body that extends in the radially outward direction, wherein the core body comprises:

a first region having a width that gradually increases in a direction perpendicular to the radial direction from the inner end along the radial direction;

a second region continuously formed in the radially outward direction with respect to the first region and having a width which is constant in a direction perpendicular to the radial direction;

a third region continuously formed in the radially outward direction with respect to the second region and having a width that gradually decreases in a direction perpendicular to the radial direction; and a fourth region continuously formed in the radially outward direction with respect to the third region and having a width that remains constant in a direction perpendicular to the radial direction, wherein the through hole is formed further outside than the first region with respect to the radial direction, wherein a width of the through hole in a circumferential direction gradually increases in the radial direction, and wherein the through hole is formed between the first region and the fourth region with respect to the radial direction.

15. The electric range of claim 14, wherein each of the plurality of ferrite cores further comprises:

an extended bent portion that protrudes upward from an upper surface of the core body, and wherein the extended bent portion is integrally formed with the core body.

* * * * *